H. G. VOIGHT.
COMBINED FLOOR CHECK AND HINGE.
APPLICATION FILED JULY 19, 1911.

1,040,965.

Patented Oct. 8, 1912.

3 SHEETS—SHEET 1.

Witnesses:

Inventor
H. G. Voight
By his Attorneys

H. G. VOIGHT.
COMBINED FLOOR CHECK AND HINGE.
APPLICATION FILED JULY 19, 1911.
1,040,965.
Patented Oct. 8, 1912.
3 SHEETS—SHEET 3.
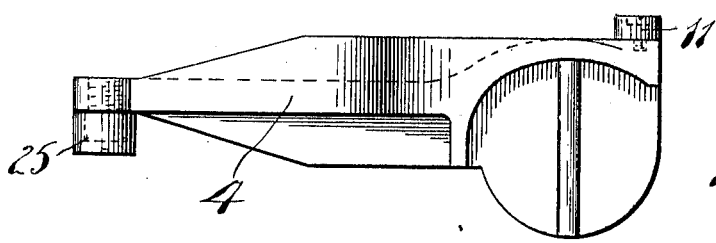
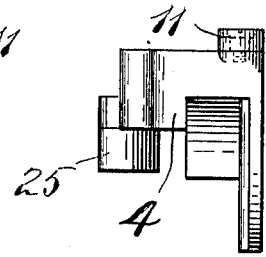
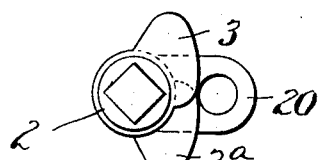
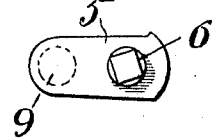
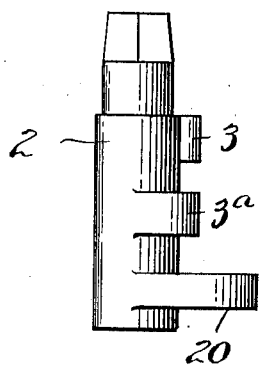
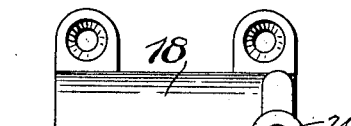
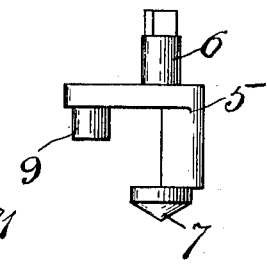
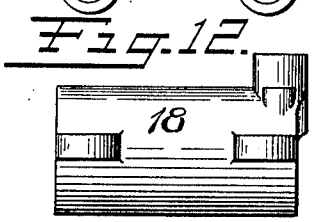
Witnesses:
Inventor
H. G. Voight
By his Attorneys H. G. VOIGHT.
COMBINED FLOOR CHECK AND HINGE.
APPLICATION FILED JULY 19, 1911.
1,040,965.
Patented Oct. 8, 1912.
3 SHEETS—SHEET 2.
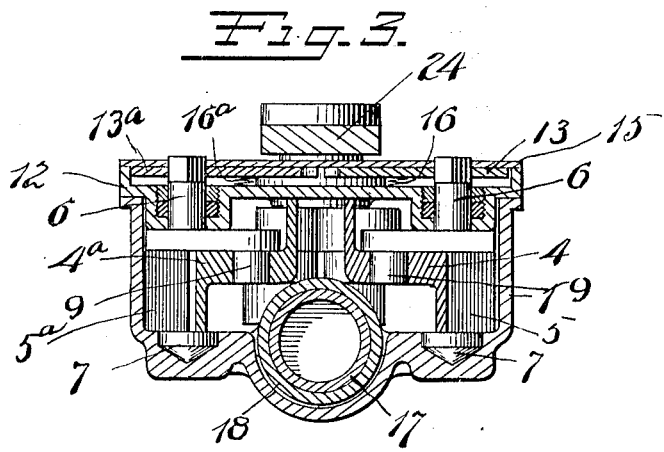
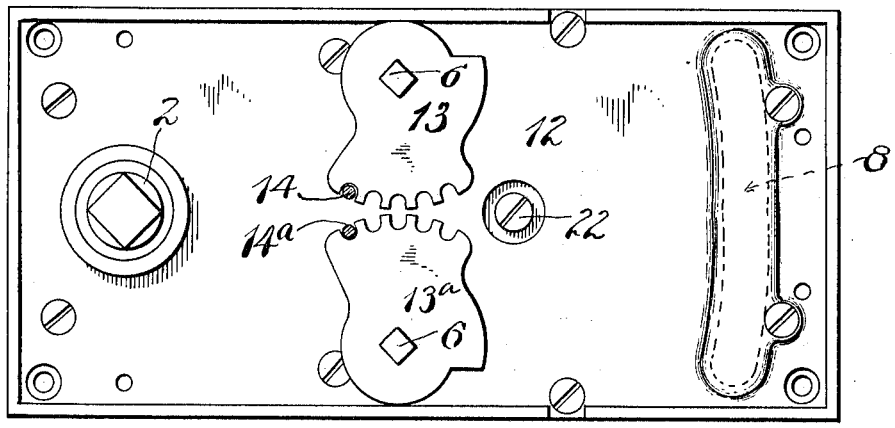
Witnesses:
Chas A Peard
Ida M Hunziker
Inventor
H. G. Voight
By his Attorneys

UNITED STATES PATENT OFFICE.

HENRY G. VOIGHT, OF NEW BRITAIN, CONNECTICUT.

COMBINED FLOOR CHECK AND HINGE.

1,040,965.  Specification of Letters Patent.  Patented Oct. 8, 1912.

Application filed July 19, 1911. Serial No. 639,262.

*To all whom it may concern:*

Be it known that I, HENRY G. VOIGHT, a citizen of the United States, residing at New Britain, Hartford county, State of Connecticut, have invented certain new and useful Improvements in Combined Floor Checks and Hinges, of which the following is a full, clear, and exact description.

My invention relates to an improved door check and closer of the sill type, that is, a checking and closing mechanism arranged to be located in the sill of a door.

The invention includes many improved features of construction and operation and is adapted to a double swing door.

Figure 1:
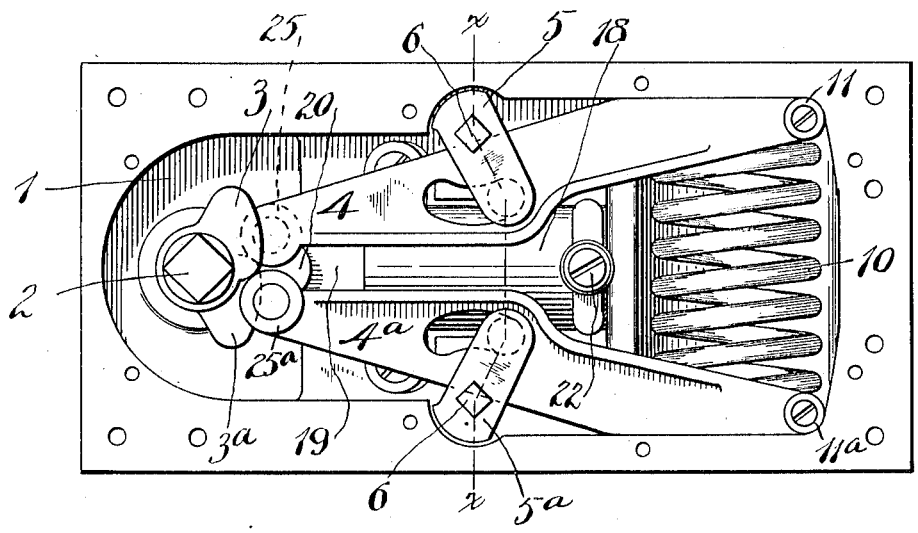
Figure 2:
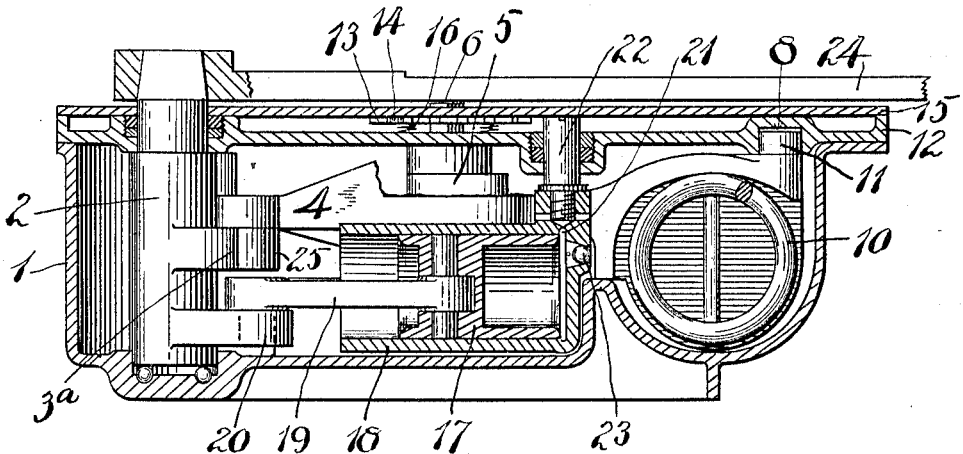

In the drawings, Figure 1 is a plan view with both top plates removed. Fig. 2 is a longitudinal section of the apparatus complete. Fig. 3 is a cross section on the plane of the line $x$—$x$, Fig. 1. Fig. 4 is a plan view of the apparatus with the uppermost top plate or cover removed. Figs. 5 to 12 inclusive are views of different details.

1 represents a main casing having a spindle 2 mounted therein at one end. The spindle 2 has cams 3—3$^a$ located at different elevations thereon. 4—4$^a$ are lever arms adapted respectively to the cams 3$^a$ and 3. 5—5$^a$ are similar pivot carrying frames for the lever 4—4$^a$ respectively. One of these frames is shown in detail in Figs. 9 and 10 and a construction of each frame will be found to include an upper bearing 6 and a lower bearing 7 for mounting in the top plate and case respectively. The upper part of the bearing 6 is preferably shaped to receive a tool whereby said frame may be adjusted.

9 represents a pivot. Each lever 4—4$^a$ has an arc-shaped slot arranged to receive the aforesaid pivot, the arc of each slot being concentric with the upper bearing 6 of the respective pivot carrying frame.

10 is a spring arranged between the rear ends of the levers 4—4$^a$, the ends of said levers being provided with suitable broad bearing faces, to hold and to receive the end thrust of the aforesaid spring 10. The extreme rear ends of each of the lever arms 4—4$^a$ are provided with anti-friction bearing rolls 11—11$^a$ respectively.

12 is a plate which closes the casing 1. This closer plate 12 has suitable bearings for the spindle 2 and the frames 5—5$^a$, and is also grooved at 8 to receive the anti-friction bearings 11—11$^a$, said groove being indicated in Fig. 4. Endwise movement of the levers 4—4$^a$ is prevented by the engagement of the rolls 11—11$^a$ against the walls thereof.

13—13$^a$ are locking plates mounted on the upper bearing ends of the pivot frames 5—5$^a$, said plates being keyed, or otherwise held against independent rotation relatively thereto respectively.

14—14$^a$ are pins carried by the underside of a top plate 15, which pins stand over the closer plate 12. The adjacent edges of the locking plates 13—13$^a$ are formed on an arc and are notched, the notches being arranged to receive the aforesaid pins 14—14$^a$. The purpose of providing these locking plates 13—13$^a$ and making the same adjustable is to permit the pivots 9—9$^a$ for each of the lever arms 4—4$^a$ to be shifted independently for the purpose of securing the desired resistance to the opening of a door. Obviously, when the top plate 15 is removed, the pivot frames 5—5$^a$ may be adjusted to the proper position, so that when the top plate 15 is re-applied they will be locked in that position. Another convenient way of adjusting the plates 13—13$^a$ is to provide sufficient clearance under each of said plates, as shown, to permit the plates to be pressed down by a tool inserted from above. When pressed down, these plates clear the ends of the studs 14—14$^a$ so that then said plates and the pivot frames may be turned to the desired position, whereupon as soon as downward pressure is relieved on the plate 13 or 13$^a$, it will rise under the influence of the spring 16 or 16$^a$, as the case may be, to again be locked by the stud 14 or 14$^a$. The forward end of each lever 4 and 4$^a$ is preferably provided with an anti-friction bearing roll one of which projects outwardly, and the other downwardly. These rolls are indicated respectively at 25—25$^a$. By this arrangement they properly engage with the cams 3—3$^a$ which are formed on the spindle 2 in different planes whereby there will be no interference one with the other.

The mechanism thus far described is set forth in sufficiently clear terms to permit any one skilled in the art to understand and construct the closer mechanism.

The checking mechanism comprises a piston 17 movable in a cylinder 18 within the case 1, said piston being connected by a rod 19 to a crank 20 on the spindle 2.

21 is a vent leading out of the rear of the cylinder 18. 22 is a valve for controlling this vent so that by varying the position of the valve, the piston may move back with more or less freedom dependent upon the adjustment of valve 22.

23 is a self-closing or check-valve opening freely into the cylinder. This check-valve may be of any well-known design, the purpose being to permit the piston to move freely outward.

The stem of the valve 22 is suitably shaped at its upper end to receive an adjusting tool. In this instance the upper end is provided with a screw-driver slot, and is accessible above the closed plate 12, said plate being provided with a suitable bearing to permit said valve stem to pass through.

By reason of arranging the lever arms 4—4$^a$ so that they will swing in a horizontal plane, great compactness is afforded, and furthermore, said arms may be suitably ribbed and constructed to furnish a maximum of strength. Furthermore, by this arrangement, a single spring may be successfully employed to operate both arms.

24 is a lever arm suitably mounted on the upper end of the spindle 2 and above the uppermost top plate 15. This arm 24 is secured to the lower edge of a door.

From the foregoing, it will be seen that when the door is opened in either direction, it will move with comparative freedom, the tension of the spring 10 only being necessary to overcome. The moment the door is released, it will be closed under the action of the spring 10, but will be retarded in its closing movement by the action of the checking piston 18.

The space within the casing 1 below the closer plate 12 is filled with a suitable liquid and all joints and exposed bearings are made liquid tight in any approved manner.

From the foregoing it will be seen that the combined apparatus is made exceedingly compact and may be adapted to double swing doors and adjusted in such a manner that the resistance to the opening movement of the door in opposite directions may be made exactly the same or may be varied as desired and as conditions require. For example, in some instances a double swing door is placed in a position where there is a heavy pressure of wind on one side. Under such conditions, the door would tend to swing open by said wind pressure so as to stand partly ajar. This may be readily overcome by simply shifting the position of one or the other pivots 9 so that it will stand in the slot of the lever arm 4 or 4$^a$ at the proper distance from the cam 3 or 3$^a$ to overcome said tendency to open. For example, when the parts are positioned as shown in Fig. 1, the door opens in either direction by the same pressure, that pressure being minimum. If it is desired to make it more difficult to open the door on one hand than on the other, one of the frames 5 or 5$^a$, as the case may be, may be swung so as to bring the pivot carried thereby nearer to the spindle 2 thus increasing the effective action of the spring 10 against that particular lever arm mounted on said pivot.

While I have shown two separate cams, it is obvious that in a broad sense the invention is not limited thereto, although two are preferred. In this and other respects the invention is capable of modification without departing from the spirit or scope of the invention.

What I claim is:

1. In a door closing apparatus, a case, a spindle mounted therein, two separate cams carried by said spindle, two separate and independent levers carried by said case and pivotally mounted intermediate their length and engaging said cams, the points of engagement for said levers respectively being at different elevations, a single spring operating between the rear ends of said levers to force the same apart, and a liquid checking device coöperating with said spindle arranged within said casing, said checking device including a cylinder, a piston therein, and a rod between said piston and spindle.

2. In a combined check and closer, a rotatable spindle, two cams carried thereby, a crank carried thereby, closing mechanism comprising two independent arms bearing at one end against said cams, an adjustable pivotal mounting for each of said arms arranged intermediate the length thereof, a spring operating between the rear ends of said arms, a casing inclosing all of said parts and including a closer plate, a groove adjacent the rear ends of said arms, a projection from the rear end of each of the arms extending into said groove, said groove being arranged transversely to prevent substantial endwise movement of each of said arms, a piston, a cylinder check within said casing and a connection between said piston and said crank.

3. In a combined door closer and check, a casing, a spindle, two independent lever arms operatively connected with the spindle and arranged to be independently moved by the rotation of the spindle in one or the other direction, a pivotal mounting for each of said arms, each mounting comprising a pivot carrying frame, a pivotal bearing carried by said frame eccentrically thereto, a locking member mounted wholly within the casing and operable from outside of the casing for holding said frame in any one of several positions, means for moving said lever arms, and checking mechanism for retarding the return movement of the spindle.

HENRY G. VOIGHT.

Witnesses:
GWENDOLINE A. JACKSON,
EDWARD B. ALLING.

Copies of this patent may be obtained for five cents each, by addressing the "Commissioner of Patents, Washington, D. C."